United States Patent [19]

Ulug

[11] Patent Number: 4,510,599
[45] Date of Patent: Apr. 9, 1985

[54] PRIORITIZED UNIDIRECTIONAL DISTRIBUTED BUS ACCESSING SYSTEM

[75] Inventor: Mehmet E. Ulug, Schenectady, N.Y.

[73] Assignee: General Electric Company, Schenectady, N.Y.

[21] Appl. No.: 482,101

[22] Filed: Apr. 4, 1983

[51] Int. Cl.³ .............................................. H04J 3/02
[52] U.S. Cl. .................................................... 370/85
[58] Field of Search ....................... 370/85, 86, 89, 94; 340/825.5

[56] References Cited

U.S. PATENT DOCUMENTS

| | | | |
|---|---|---|---|
| 3,851,104 | 11/1974 | Willard et al. | 179/15 |
| 3,904,829 | 9/1975 | Martin et al. | 370/86 |
| 4,002,842 | 1/1977 | Meyr et al. | 370/86 |
| 4,063,220 | 12/1977 | Metcalfe et al. | 340/147 |
| 4,161,786 | 7/1979 | Hopkins et al. | 370/85 |
| 4,210,780 | 7/1980 | Hopkins et al. | 370/80 |
| 4,293,948 | 10/1981 | Soderblum | 370/86 |

OTHER PUBLICATIONS

Fouad A. Tobagi, "Multiaccess Protocols in Packet Communication Systems, " IEEE Transactions on Communications, vol. Com-28, No. 4, Apr. 1980, pp. 468-488.
"Multiplex Interface Control in a Closed Ring Network", IBM Technical Disclosure Bulletin; vol. 26, No. 5, Oct. 1983, Volk; pp. 2272-2275.

Primary Examiner—Douglas W. Olms
Assistant Examiner—Frank M. Scutch, III
Attorney, Agent, or Firm—George B. Fox; James C. Davis, Jr.; Bernard J. Lacomis

[57] ABSTRACT

A plurality of bus interface units (BIUs), capable of placing information packets on a unidirectional transmit bus, are coupled to the transmit bus at locations spaced therealong. Each BIU comprises a transmit bus input port and a transmit bus output port, wherein the transmit bus input port of each BIU is coupled to the transmit bus output port of the next upstream BIU, and a receive bus input port connected to a receive bus. Each BIU includes a memory for storing at least one information packet to be transmitted and a control circuit associated with the memory. In a passive mode, the control circuit operates the BIU like a repeater, wherein packets received on its transmit bus input are reconstituted and retransmitted on its transmit bus output. In an active mode, the control circuit causes the BIU to transmit information packets stored in its memory. Each information packet may have a predetermined priority. The control circuit aborts transmission of an information packet whenever the BIU receives a higher or equal priority packet than it is transmitting and transmits the received packet in lieu of the aborted packet. Packets received during transmission, having lower priority than the packet being transmitted, are stored in memory for later transmission.

38 Claims, 10 Drawing Figures

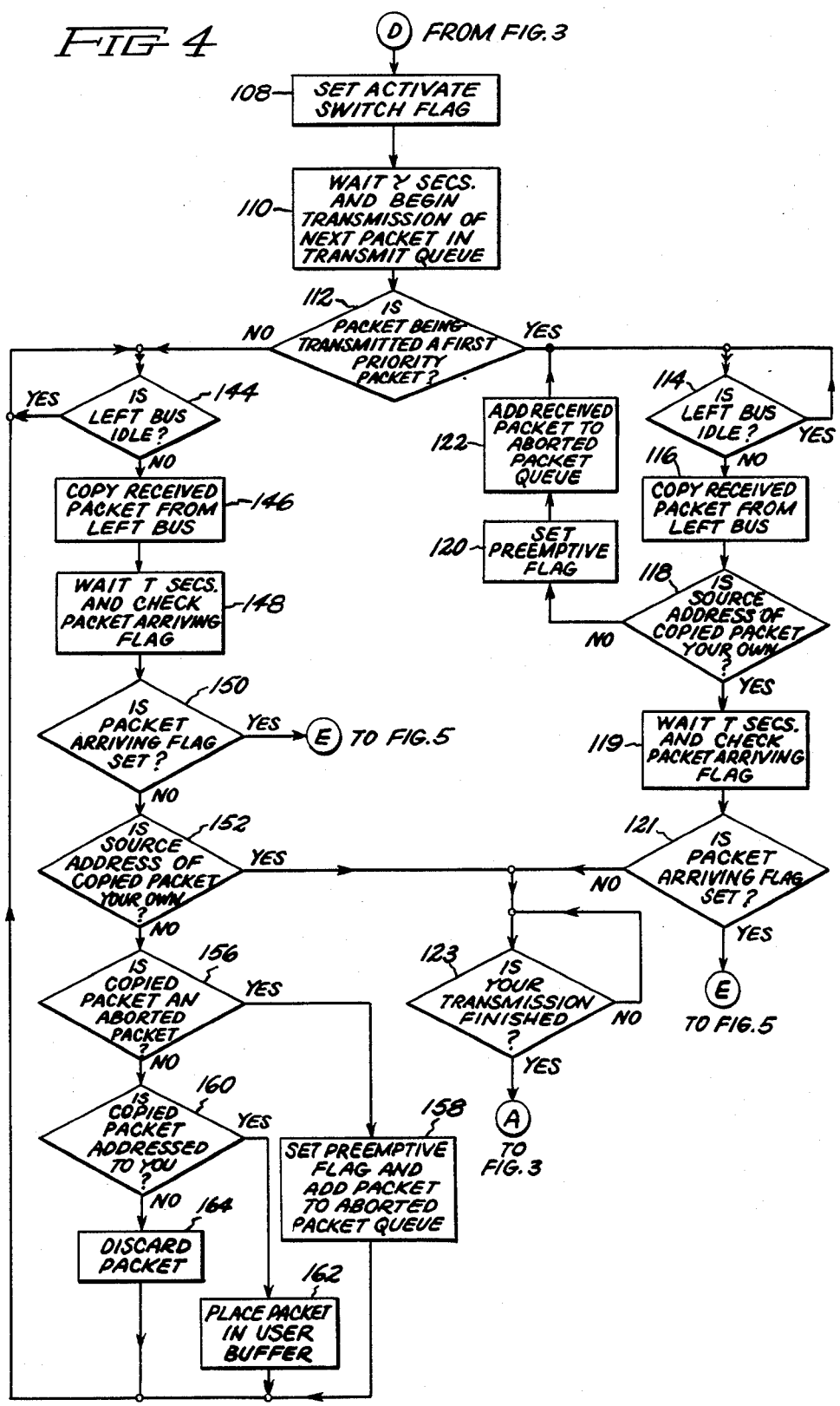

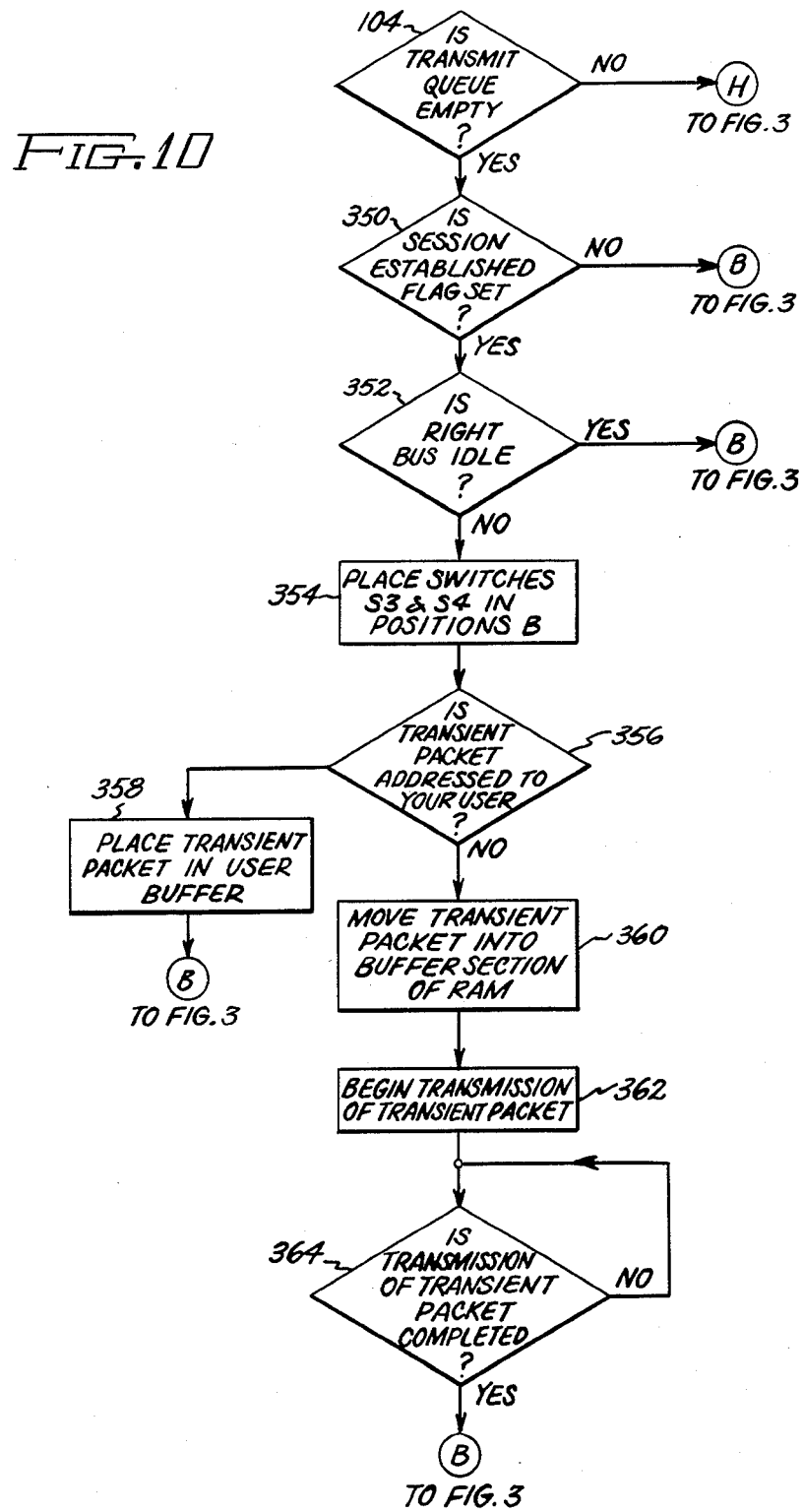

PRIORITIZED UNIDIRECTIONAL DISTRIBUTED BUS ACCESSING SYSTEM

BACKGROUND OF THE INVENTION

The present invention is directed towards a bus accessing system and method in which a plurality of user terminals communicate with each other via a plurality of bus interface units (BIUs) which are connected to a common transmission bus. More specifically, it relates to a bus accessing system and method wherein collisions between information packets are avoided, thus permitting the speed of a contention system to be achieved under light bus usage while allowing high density usage, as in a token passing system, to be obtained. Light bus usage is intended to mean less than about 40 percent of maximum possible utilization and heavy bus usage is intended to mean greater than about 80 percent of maximum possible bus utilization of information packet transmission without collision.

In known bus communication systems, each of a plurality of BIUs is associated with at least one user terminal, respectively, and periodically places information from its associated user terminal on the transmission bus for transmission to the other BIUs and their associated user terminals. Each BIUs formats user information into one or more information packets which generally include: a source address (address of BIU and port associated with the user terminal which originated the information packet); a destination address (address of BIU and port associated with the user terminal for which the information is intended); information to be transmitted; and various other information, such as parity, cyclic redundancy check (CRC) bits, etc. Once the BIU has properly formatted the information, it places the information packet on the bus for transmission to the remaining BIUs at instants determined by the particular bus accessing method being used.

One such bus accessing method is known as a time division multiplexer system, wherein each user terminal is assigned a predetermined specific time slot or interval during which it can gain access to the transmission bus and place its information packets thereon. Exemplary of such systems is U.S. Pat. No. 3,851,104—Willard et al. While such systems are simple, inasmuch as they avoid the possibility of more than one information packet being placed on the bus during the same interval without the need for any complex intelligence, they are inefficient from a time utilization standpoint since the bus will be idle whenever a BIU has no information to transmit during its assigned interval.

Another bus accessing scheme is a contention system using a listen-while-talk before and during transmission protocol. In this system, the BIU continually monitors the state of the transmission bus and places information packets on the bus whenever the bus is silent, i.e. no other information packets are sensed on the bus. If, during a transmission, the BIU detects other information packets on the bus, it halts its transmission for a predetermined period of time and then attempts to regain access to the bus when the line is silent. Exemplary of such systems are U.S. Pat. Nos. 4,210,780—Hopkins et al. and 4,063,220—Metcalfe et al. One drawback of contention systems is that they are not prioritized and high priority information may be delayed from access to the bus for substantial periods of time. Another drawback is that the bus can only be loaded to about 40 percent of its maximum information carrying capability without overloading the entire system.

Still another bus accessing system and method uses token passing. A token is sequentially passed from one BIU to another and only during the time interval a BIU has the token can the BIU place its information packet on the bus. Although this system avoids collisions, the token must be sequentially passed to each BIU. If a BIU has no information packet to transmit this will result in inefficient bus utilization since the bus will be idle during the interval the non-transmitting BIU controls the token. Exemplary of a token passing system is U.S. Pat. No. 4,464,749 issued Aug. 7, 1984, assigned to the instant assignee and incorporated in its entirety herein by reference.

Accordingly, an objective of the present invention is to provide a bus accessing system and method wherein fast access to the bus is provided under light bus utilization.

Another object is to provide a bus accessing system and method wherein collisions between information packets on the bus are avoided thereby permitting heavy bus utilization.

BRIEF DESCRIPTION OF THE INVENTION

In accordance with the bus accessing scheme of the present invention, each information packet to be transmitted is assigned a predetermined priority. Each time a BIU has an information packet to transmit, it senses both a transmit and a receive bus to determine if any other information packet is on the buses. If not, the BIU places its information packet on the transmit bus. If the BIU receives an information packet on the transmit bus from an upstream BIU while it is transmitting, it compares the priority of the information being transmitted with the priority of the information packet received on the transmit bus. If the priority of the information packet received on the transmit bus is lower than the priority of the information packet being transmitted, the transmission continues and the information packet received on the transmit bus is stored by the transmitting BIU for later retransmission. If the priority of the information packet received is equal to or higher than the priority of the information packet being transmitted, the BIU immediately aborts transmission of its own information packet and begins retransmitting the equal or higher priority packet. In this manner, a single high or equal priority packet generated by an upstream BIU can abort a plurality of information packets from downstream BIUs. This ensures that high priority information packets of upstream BIUs will be received by downstream BIUs and forwarded to appropriate users in a relatively short time.

Bus accessing schemes may be used in connection with voice encoded data which are transmitted in the form of mini-packets, such as disclosed in the aforementioned Ulug patent application Ser. No. 351,821 which are typically substantially shorter in duration than standard information packets. Since voice encoded information must be time transparent or circuit switched (that is, there must be no appreciable delays in transmission of these packets in order that received voice information be continuous), it is imperative that mini-packets be transmitted with minimal delay. Thus, in order to appear time transparent to a user, a packet destined for the user must arrive at the associated BIU of the user before the end of a previously received packet is transferred from the BIU to the user. This is achievable by appropriate selection of packet format, since the speed of packet propagation over a transmission bus is generally much greater than the speed at which a packet is transferred from a BIU to its associated user.

In order to permit transmission of voice encoded data without distruptive delays, information packets of the present invention are assigned a prior priority of, for example, one through four with one the highest priority and four the lowest. All minipackets are assigned first priority. Certain other high priority information, which may be formed of variable length packets, are also designated first priority. Less important information is designated second, third or fourth priority information as required.

Once transmission of any information packets has been aborted, the system enters a preemptive mode wherein each BIU whose information packet was aborted retransmits the aborted information packet after the preempting or aborting packet has been received by all BIUs. Particularly, each BIU transmits its information packet in order of priority and serial position of the BIU on the transmit bus. All highest priority packets are transmitted first, having information packets originating from upstream BIUs transmitted before information packets originating from downstream BIUs. Thereafter, all lower priority packets are transmitted in analogous order. Under passive or active mode operation, a single high priority packet may abort one or more low priority packets. The aborted packets appear on the receive bus of the transmission line as a single train of aborted packets followed by the preempting or aborting packet. As soon as the preempting packet has been received by all BIUs, each of the BIUs retransmits its preempted packet in the foregoing order.

The features of the invention believed to be novel are set forth with particularity in the appended claims. The invention itself, however both as to organization and method of operation, together with further objects and advantages thereof, may best be understood by reference to the detailed description taken in connection with the accompanying drawings.

BRIEF DESCRIPTION OF THE DRAWINGS

FIGS. 3–8 are flow diagrams illustrating the computer program followed by each of the bus interface units of FIG. 1; and FIGS. 9 and 10 are flow diagrams illustrating another embodiment of the computer program followed by each of the bus interface units of FIG. 1.

DETAILED DESCRIPTION OF THE INVENTION

Figure 1:
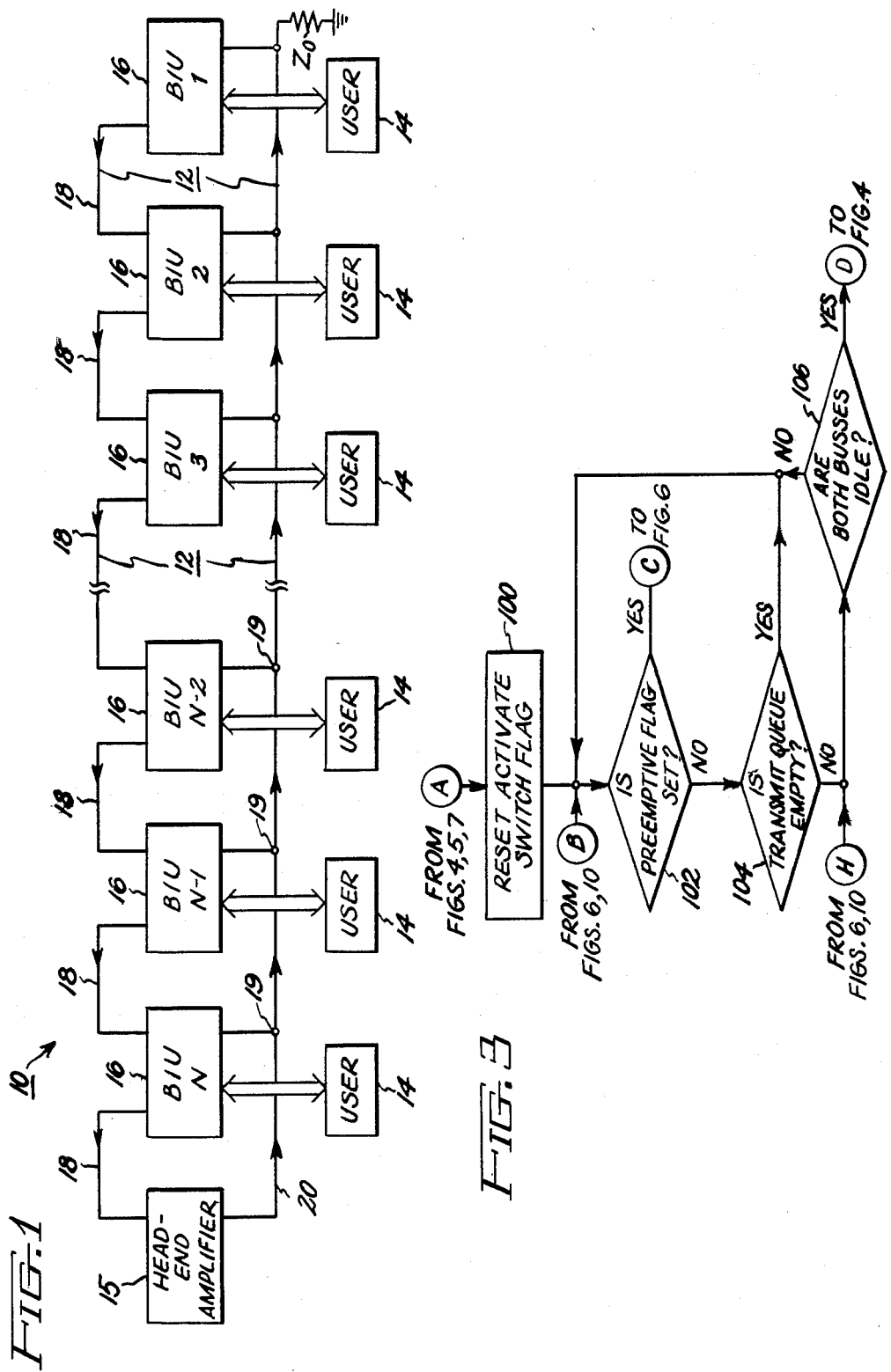
FIG. 1 is a block diagram illustrating a bus communication system in which the bus accessing scheme of the present invention may be used.

Referring now to the drawing, wherein like numerals indicate like elements, there is shown in FIG. 1 a bus communication system 10 in which the bus accessing scheme of the present invention may be used. Bus communication system 10 includes a transmission bus 12 which is connected as a serial straight-line topology bus to a plurality of user terminals or data terminal equipment (DTE) 14 via a plurality of bus interface units (BIUs) 16. Transmission bus 12 may comprise a single coaxial cable although preferably includes a coaxial or fiber optic cable forming a left or receive bus 20 and a corresponding segmented coaxial or fiber optic cable having appropriate connectors forming a right on transmit bus 18. The upstream end of receive bus 20 may be terminated in the characteristic impedance $Z_0$ of bus 20 when bus 20 comprises coaxial cable and with a dark surface when bus 20 comprises a fiber optic cable, in order to dissipate information packets and to prevent reflections thereof along bus 20. Fiber optic cable may be chosen for its high noise immunity although an increase in price is paid for passive connectors required at junctions 19 to supply a sample of signal sensed on left bus 20 to BIU 16 without distorting the signal remaining on left bus 20 directed to the remaining upstream BIUs. Further, each BIU 16 may have a plurality of user terminals 14 coupled thereto, typically via ports (not shown) wherein each port of BIU 16 is assigned an identification address. If necessary, the bus may be folded upon itself to provide a ring, star or branching tree bus topology. Bus communication system 10 permits any user terminal 14 to transmit data in the form of information packets to any other user terminal 14 via transmission bus 12.

Users 14 may be computers, terminals or other devices capable of generating and/or accepting electronic information. Transmission bus 12 may take the form of a unidirectional fiber optic system including a right bus 18 and a left bus 20 or any other unidirectional system. Right bus 18 serves as the transmit bus onto which each BIU 16 places its information packet to be transmitted. In one configuration, information packets are received by each BIU 16 via left bus 20, after being amplified by amplifier 15, and are subsequently applied to appropriate user terminals 14. Amplifier 15 may comprise a conventional amplifier or in certain cases, as where each of right and left buses 18 and 20, respectively, comprises a single coaxial cable, may comprise a head-end amplifier. A head-end amplifier supplies a carrier signal at its output having a frequency different from the frequency of a carrier signal at its input, wherein the output carrier signal has encoded therein information encoded into the received carrier signal. A head-end amplifier may be employed in systems wherein it is desirable to provide noise immunity by separating the frequency of the transmitted and received carriers such that harmonic influence therebetween is minimized.

The manner in which user terminal information is transmitted between user terminals 14 and respective BIUs 16, and the method for properly formatting information packets as they are transferred between user terminals 14 and BIUs 16, are well known in the art and do not form part of the present invention. Accordingly, specific methods and apparatus for carrying out these transfers will not be described herein. Exemplary methods for achieving these results may be found in U.S. Pat. Nos. 4,063,220 and 4,210,780. The present invention concerns the bus accessing method or protocol under which information packets, once properly formatted, either according to a packet switching or a circuit switching mode of operation, are transmitted from BIU 16 to transmission bus 12 and the manner in which packets on transmission bus 12 are transferred to individual BIUs 16 for later transfer to user terminals 14. Accordingly, for ease of discussion, it is assumed that information is periodically transferred from a user terminal 14 to associated BIU 16 and formatted for transmission by BIU 16.

Figure 2:
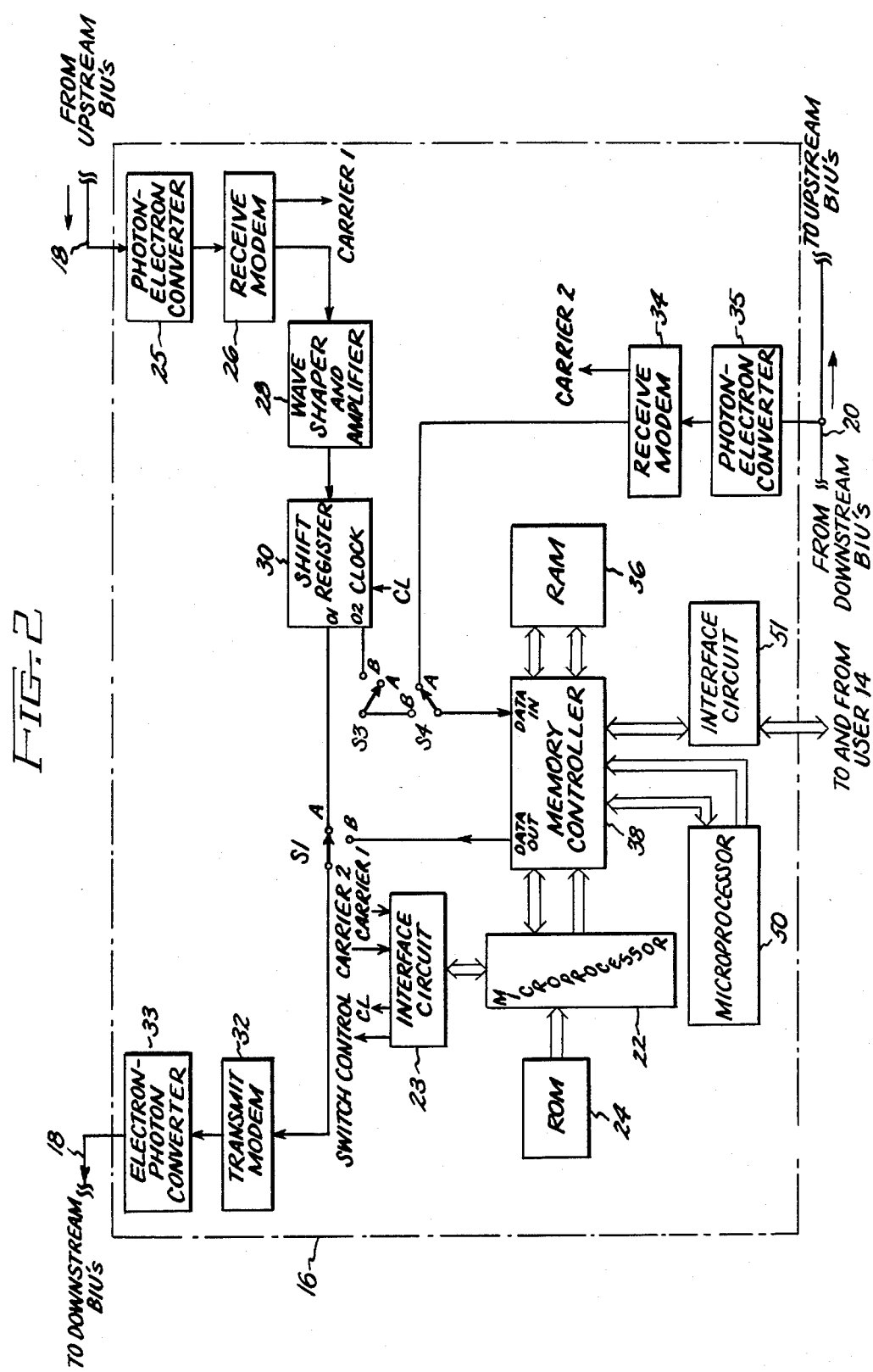
FIG. 2 is a block diagram illustrating the components of a single bus interface unit of FIG. 1.
Figure 5:
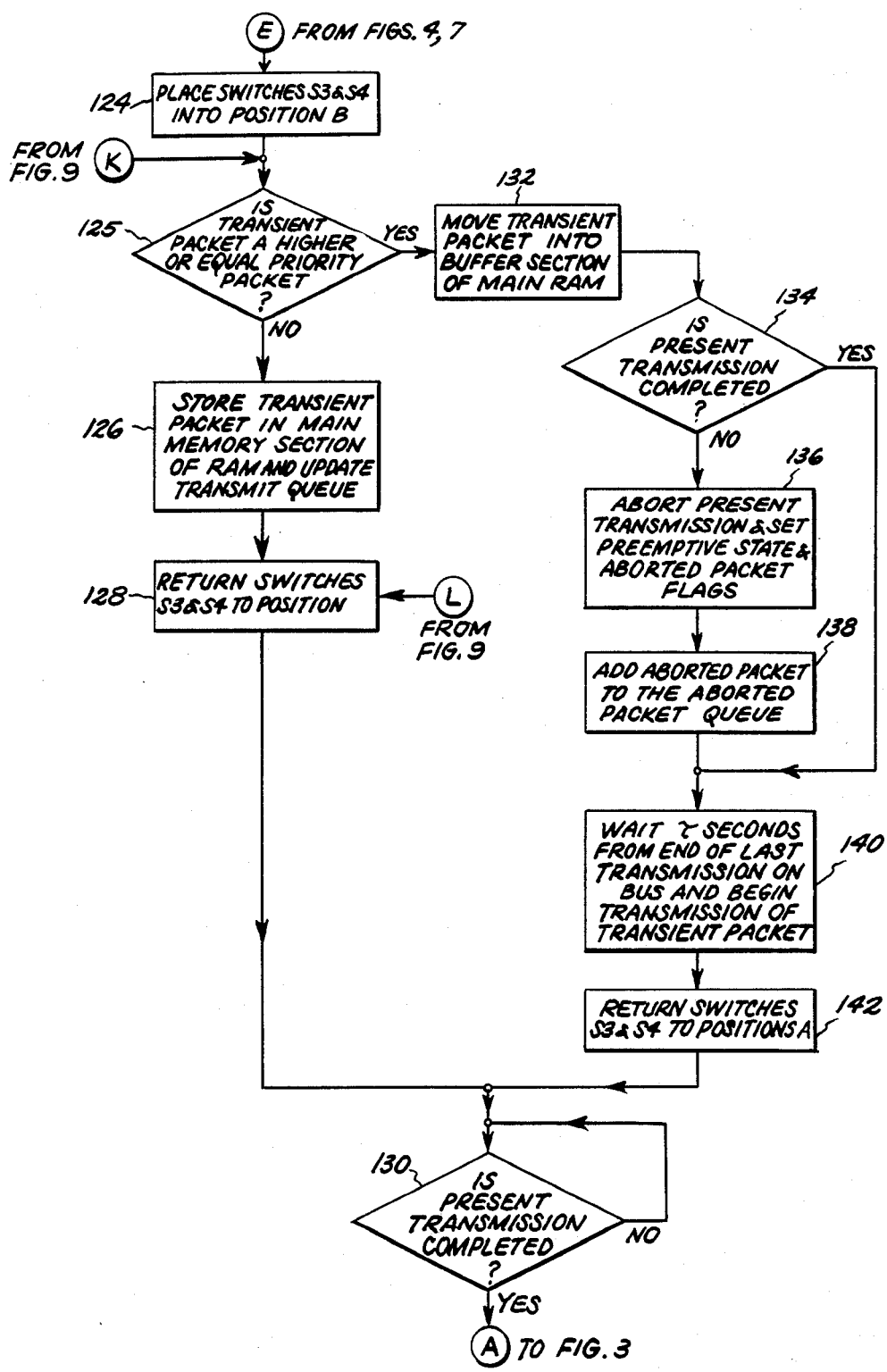

A block diagram of a single BIU 16 is illustrated in FIG. 2. It is to be understood that all BIUs may be similarly configured. As shown therein, BIU 16 includes a microprocessor 22 such as a model Z80 microprocessor manufactured by Zilog, or the like, which controls the operation of BIU 16 in accordance with a program stored in a read only memory (ROM) 24 or erasable programmable read only memory (EPROM), such as model 2732 manufactured by Intel, or the like. The operation of this program is illustrated in the flow diagrams of FIGS. 3-10 and is described in greater detail below. User 14 is coupled to random access memory (RAM) 36 through interface circuit 51 and memory controller 38. Interface circuit 51 comprises shift registers (not shown) and buffers (not shown) as is known in the art. Microprocessor 50 (which may be of the same type as microprocessor 22) has embedded therein (or in an associated ROM (not shown)) a program which stores data to be transmitted from user 14 in RAM 36 through interface circuit 51 and memory controller 38, forms information packets from these data and stores the formed information packets in RAM 36. Likewise, microprocessor 50 accepts information packets from RAM 36 through memory controller 38 which are addressed to user 14 and formats them for transfer to user 14 through memory controller 38 and interface circuit 51.

BIU 16 is capable of operating in three modes; passive, active and preemptive. In the passive mode, microprocessor 22 places an electronic switch S1, such as model DG201 switch manufactured by Datel, or the like, in position A and BIU 16 operates as a repeater for information packets received by BIU 16 from an upstream BIU. Particularly, an information packet is received by BIU 16 via a photon-to-electron converter circuit 25, such as a model 698-127DG converter manufactured by Augat, Attleboro, Mass., or the like, when right bus 18 comprises a fiber optic strand or cable. Converter 25 converts the signal from an optical to an electrical signal. The converted signal is applied to a receive modem 26, such as a model 30-0078 modem manufactured by Computrol, Ridgefield, Conn., or the like, which transmits it to a wave shaper and amplifier circuit 28, such as a model 96SO2 single-shot multivibrator manufactured by Fairchild, or the like, wherein each individual bit of the information packet is reshaped and amplified. Receive modem 26 is supplied with a carrier signal including digital information encoded thereon from bus 18 and provides a signal at its output having the same sense of the encoded information without the carrier. If right bus 18 comprises coaxial cable then right bus 18 is connected directly to receive modem 26 without need of photon-to-electron converter circuit 25. The reconstituted information packet from wave shaper and amplifier circuit 28 is applied to a shift register 30 such as a plurality of model 299 shift registers (appropriately connected in series) manufactured by Texas Instruments, or the like, which (under control of microprocessor 22 which supplies a clock CL signal thereto through interface circuit 23) reconstructs the timing of the information packet which may have been degraded by wave shaper and amplifier circuit 28 and applies the reconstructed information packet to switch S1 via output 01. Output 01 is connected to, for example, the third position or stage of shift register 30, resulting in a signal appearing at output 01 thereof having the same sense and delayed from the signal appearing at the input of receive modem 28 by the periods of approximately three bits. Output 01 could be connected to a different stage of shift register 30 should a different delay be desired. The output signal from shift register 30 is applied to a transmit modem 32, such as a model 30-0078 modem manufactured by Computrol, Ridgefield, Conn., or the like, through switch S1, converted into an optical signal by electron-to-photon converter 33, such as a model 698-126EG1 converter manufactured by Augat, Attleboro, Mass., or the like and placed on right bus 18 whenever right bus 18 comprises a fiber optic cable. If right bus 18 comprises a coaxial cable then the output of transmit modem 32 is connected directly to right bus 18 without need of electron-to-photon converter 33. Transmit modem 32 receives digital information and encodes the digital information on a carrier signal having a relatively fast frequency which is available at the output of modem 32.

In the passive mode, BIU 16 records or copies any information packets sensed on left bus 20. Particularly, these packets are converted into electrical signals by photon-to-electron converter 35 (may be same type as converter 25) whenever left bus 20 comprises a fiber optic cable and are applied to receive modem 34 (may be same type as modem 26), and thence stored in a received packet storage section (not shown) of random access memory (RAM) 36, such as a model 2118 RAM manufactured by Intel, or the like, via switch S4 and a memory controller 38. If left bus 20 comprises a coaxial cable then it is connected directly to receive modem 34 without need of photon-to-electron converter 35. Memory controller 38 controls the transfer of information into and out of RAM 36 under the direction of microprocessor 22. One commercially available memory controller useful with the present invention is sold by Intel under the product designation 8257 programmable DMA controller. As is described in greater detail below, each information packet placed into the received packet storage section of RAM 36 is examined by microprocessor 22 to determine whether it is an aborted packet, whether it is a completed transmission of a previously aborted packet and whether it is intended for user 14 associated with BIU 16.

BIU 16 enters the active mode whenever it has an information packet to transmit. In this mode, microprocessor 22 causes transmission of any information packet stored in a main information packet storage section (not shown) of RAM 36 in accordance with a main transmit queue. The main transmit queue includes two types of information packets: those received from user 14 associated with BIU 16 and those received from upstream BIUs and stored while BIU 16 is transmitting (i.e. not in a passive mode). These two types of information packets are treated by BIU 16 as its own information packets and are transmitted in accordance with the main transmit queue which arranges these information packets in accordance with a predetermined heirarchy. Exemplary of such heirarchy is one in which information packets are arranged in accordance with the priority of the packet and the location of its source BIU 16 serial connection to transmit bus 18. Thus, first priority packets are arranged to be accessed or listed first, followed by second priority packets, etc. Additionally, within each priority grouping, the packets of the most upstream BIUs are arranged to be accessed or listed before those of further downstream BIUs. Whenever BIU 16 is clear to transmit an information packet, i.e. it detects no information on buses 18 and 20, it transmits the next information packet in the main transmit queue. In order to transmit these information packets, microprocessor 22 causes switch S1 to move to position B so that the information packet stored in RAM 36 may be transmitted onto right bus 18 via switch S1, transmit modem 32 and electron-to-photon converter 33. Although the system and method of the present invention are especially useful for transmitting information packets having predetermined priorities, it is to be understood that they are also useful for transmitting information packets having all the same or no priority.

If an incoming or transient information packet on right bus 18 is sensed, as indicated by the activation of the CARRIER 1 signal from receive modem 26, while BIU 16 is transmitting, and the received packet is not an equal or higher priority packet than is being transmitted, it is stored in the main information packet section of RAM 36 and placed in the appropriate position in the main transmit queue. At this time, BIU 16 no longer considers the incoming packet as a transient packet but rather considers it one of its own packets and will transmit it in due course in accordance with the heirarchy of the main transmit queue. Of course, the program may be modified such that transient packets having the same priority as the information packet being transmitted do not abort the transmission and are placed in the appropriate position in the main transmit queue. The CARRIER 1 signal assumes a first or second logic state or voltage level in accordance with whether or not, respectively, a carrier signal is detected at the input of receive modem 26.

Whether the transient packet is placed into the buffer section of RAM 36 for immediate retransmission or into the main transmit queue for subsequent transmission, it must be transferred from shift register 30 to RAM 36. To this end, microprocessor 22 causes electronic switches S3 and S4 to move to position B whenever a transient packet is to be transferred to RAM 36. Switch S3 is connected to a tap 02 internally connected to, for example, the fortieth stage of shift register 30, to provide delay such that the transient packet is retained in shift register 32 until microprocessor 22 is ready to transfer it to RAM 36. Output 02 could be connected to a different stage of shift register 30 should a different delay be desired. The instant at which switches S3 and S4 are moved to position B is determined by the computer program which is described below. Switches S1, S3 and S4 are illustrated, for convenience, as mechanical switches, although electronic switches are preferably used.

Whenever BIU 16 aborts transmission of a packet being transmitted, as when the received transient packet is a first priority packet, it identifies the packet as an aborted packet by placing an aborted packet flag at the end of the packet. For example, all non-aborted packets might end with the digitally encoded signal 01111110. An aborted packet may end with the digitally encoded signal 01111111. In this way, each BIU 16 is able to identify and recognize an aborted packet as it is received on left bus 20. Once any aborted packet is received on left bus 20, BIU 16 is operated in a preemptive mode wherein each BIU whose packet has been aborted retransmits its aborted packet in accordance with an aborted packet queue of RAM 36, in which packets are arranged in order of priority position of the originating BIU 16 along right bus 18 in a manner similar to the main transmit queue of RAM 36. If BIU 16 receives a first priority transient packet from an upstream BIU during retransmission of an aborted packet, it will again abort its transmission and retransmit the first priority transient packet. This ensures that high priority packets, such as mini-packets, will be transmitted with little or no delay.

Having described the general structure and operation of the system and of a BIU 16, detailed operation of the system will now be described with reference to the flow diagram of FIGS. 3-10. This flow diagram corresponds to the main computer program stored in RAM 24 (FIG. 2).

As noted above, the position of switch S1 (FIG. 2) must be changed as a function of the mode of BIU 16. Particularly, switch S1 must be in position A when BIU 16 is operating in the passive mode and must be in position B when BIU 16 is operating in the active and preemptive modes. Positioning of switch S1 is controlled by an ACTIVATE SWITCH flag which is periodically set and reset by the main program. The regenerator logic subroutine illustrated in FIG. 8 controls the position of switch S1 (FIG. 2) as a function of the state of the ACTIVATE SWITCH flag and provides information to the main program concerning the status of transient packets received by BIU 16 (FIG. 2).

Throughout this description, reference will be made to flags which are set by the program. In each case, specific memory storage locations (not shown) in RAM 36 (FIG. 2) correspond to the referred flag. When the program is to set a flag, it places a predetermined logic bit (i.e., "0" or "1") in the memory storage location assigned to the flag. Whenever the program must determine the state of a flag, it examines the appropriate memory location.

Figure 8:
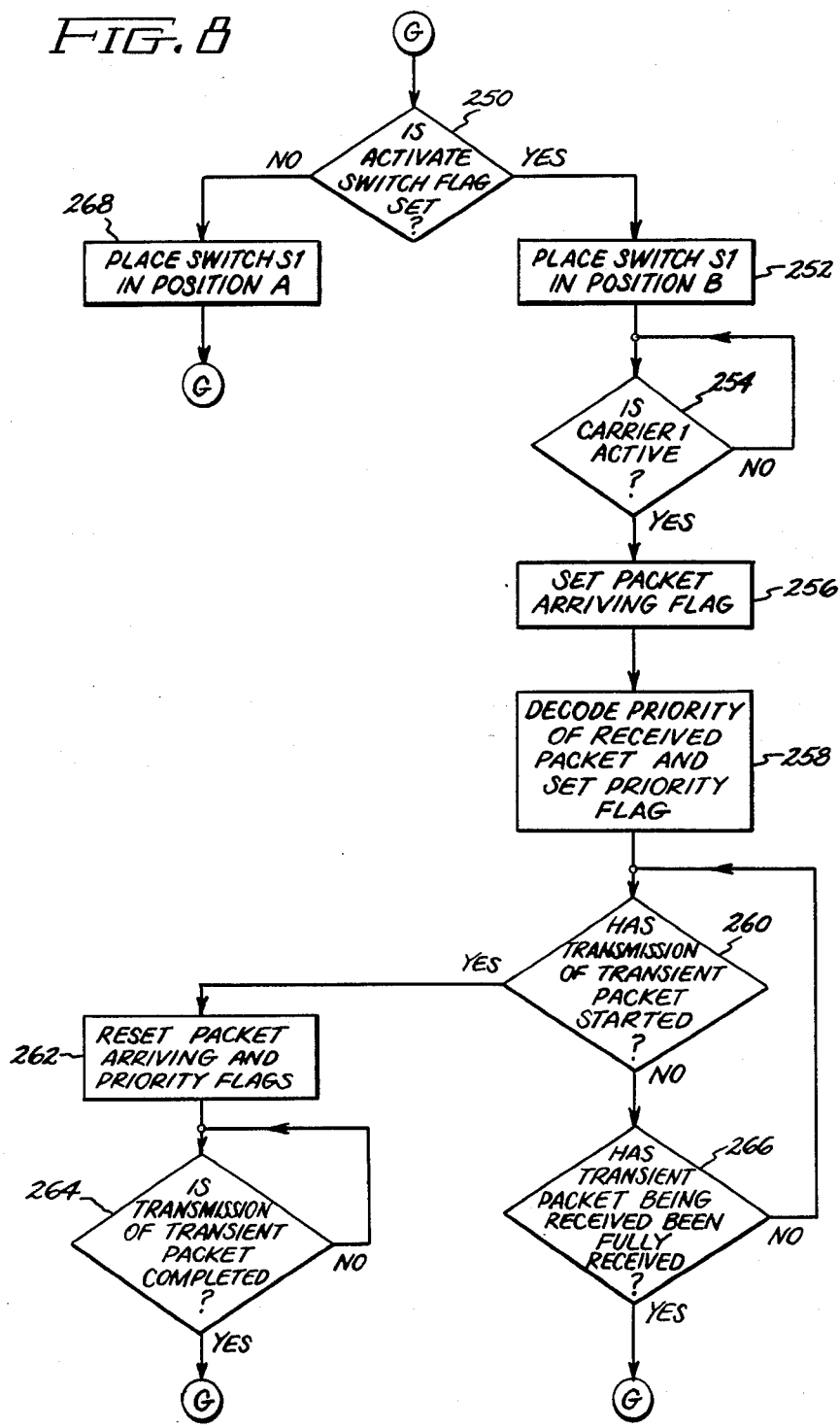

Referring to FIG. 8 with reference to the apparatus of FIG. 2, and beginning at decision block 250, the regenerator logic subroutine determines if the ACTIVATE SWITCH flag is set. If the flag is set, the program proceeds to instruction block 252 to command switch S1 (FIG. 2) into position B. Switch S1 may comprise an electronic switch whose position is determined by an electronic signal applied thereto. Appropriate signals are generated by microprocessor 22 and are applied through interface circuit 23 (FIG. 2) to switch S1 to cause switch S1 to move to position B.

Once switch S1 is in position B, the subroutine executes decision block 254 to determine if the CARRIER 1 signal generated by receive modem 26 (FIG. 2) and supplied to microprocessor 22 through interface circuit 23 is active. The CARRIER 1 signal is active whenever receive modem 26 is sensing an information packet. The subroutine continues to sample the CARRIER 1 signal until it determines that the CARRIER 1 signal is active. At this point, BIU 16 (FIG. 2) is receiving an information packet from an upstream BIU and the program executes instruction block 256 to set the PACKET ARRIVING flag. The PACKET ARRIVING flag indicates to the main program that a transient packet has been received by BIU 16. Proceeding to instruction block 258, the priority of the received packet is decoded and a PRIORITY flag, indicative of the priority of the received packet is set. If four priorities are used, two bits are required for indicating priority and for the priority flag. Proceeding to decision block 260, the subroutine determines if BIU 16 has begun transmitting the transient packet. If it has, the subroutine proceeds to instruction block 262 and resets the PACKET ARRIVING and PRIORITY flags. Proceeding to decision block 264, the subroutine determines if the transmission of the transient packet has been completed. If it has, the subroutine returns to decision block 250. Referring to decision block 260, if transmission of the transient packet has not yet started, the subroutine proceeds to decision block 266 and determines if the transient packet has been fully received. If it has not, the subroutine repeats step 260. If the transmission of the transient packet has not yet started, steps 260 and 266 are repeated until the transient packet has been fully received, which returns the subroutine to decision block 250 to reinitiate the regenerator logic subroutine.

Assuming the ACTIVATE SWITCH flag is not set when the program reaches decision block 250 (indicating that BIU 16 is operating in the passive mode), the program proceeds to instruction block 268 and commands switch S1 (FIG. 2) into position A by generating an appropriate control signal which is applied to switch S1 through interface circuit 23 (FIG. 2). The subroutine then returns to decision block 250 to reinitiate the regenerator logic subroutine.

Referring to FIG. 3, the main program is initiated at instruction block 100 by resetting the ACTIVATE SWITCH flag. As is clear from the foregoing description of the regenerator subroutine logic (FIG. 8) this causes switch S1 (FIG. 2) to be placed in position A, establishing BIU 16 in the passive mode. Proceeding to decision block 102, the program determines if the PREEMPTIVE flag is set. As is described below, the PREEMPTIVE flag is set whenever BIU 16 either aborts its own packet or detects an aborted packet on left bus 20. If the PREEMPTIVE flag is set, BIU 16 operates in the preemptive mode in accordance with the subroutine illustrated in FIGS. 6 and 7. These subroutines are described in more detail below.

Assuming that the PREEMPTIVE flag is not set, BIU 16 operates in either the active or passive mode. The program proceeds to decision block 104 to determine if the main transmit queue is empty. As described above, the main transmit queue lists each of the information packets stored in RAM 36 (FIG. 2) which are to be transmitted by BIU 16 during the active mode. If the main transmit queue is empty, indicating that BIU 16 has no packet to transmit, the program repeats step 102. The program continues to loop through steps 102 and 104 until an aborted packet is detected on left bus 20 (FIG. 1) and the PREEMPTIVE flag is set or until an information packet from user 14 is placed in the main transmit queue.

Assuming that there is at least one information packet in the main transmit queue (i.e., BIU 16 has at least one information packet to transmit), the program proceeds to decision block 106 to determine if both right and left buses 18 and 20 (FIG. 1), respectively, are idle. The program can determine if both or either bus is idle utilizing any conventional mechanism for detecting transmission activity on buses. By way of example, the program can examine the condition of the CARRIER 1 and CARRIER 2 signals generated by modems 26 and 34 (FIG. 2), respectively. The CARRIER 2 signal is generated analogously to the CARRIER 1 signal as hereinbefore described. These signals are applied to microprocessor 22 (FIG. 2) via an appropriate interface circuit 23 (FIG. 2) which conditions the signals if they are not directly compatible with microprocessor 22 and applies them to an appropriate portion of microprocessor 22 in response to appropriate commands from microprocessor 22 in a manner well known in the art.

If both buses are not idle, the program loops through steps 102, 104 and 106. Once step 106 determines that both buses are idle, the program proceeds to instruction block 108 of FIG. 4. Since it was assumed BIU 16 has a packet to transmit, switch S1 (FIG. 2) must be moved into position B. The program sets the ACTIVATE SWITCH flag (step 108) which causes regenerator subroutine logic (FIG. 8), as hereinbefore described, to move switch S1 into position B. Proceeding to instruction block 110, the program waits an interval of $\tau$ seconds (corresponding to the interframe spacing time which is defined by Institute of Electrical and Electronics Engineers (IEEE) standard 802 (1982 draft) as the minimum time permissible between successive transmissions onto a communication bus) from the end of the last transmission of an information packet on left bus 20 (this time may have already expired) and then signals BIU 16 (FIG. 2) to begin transmitting the next sequential packet in the transmit queue. Of course the value of $\tau$ can be preset to the required value or even to zero if no waiting is required for a particular system application. Once transmission has started, the program proceeds to decision block 112 to determine if the packet being transmitted is a first priority packet.

At this time, the program looks for its own transmitted packet on the left bus 20. If it receives its own packet, it recognizes that the packet has been transmitted successfully and has not preempted any information packet transmitted by downstream BIUs. If it detects the receipt of any packet except its own packet, it knows that either its packet or another packet has preempted at least one packet generated by a downstream BIU. To this end, the program proceeds to decision block 114 and examines the condition of left bus 20 (FIG. 1). The condition of left bus 20 can be determined by examining the condition of the CARRIER 2 signal output of receive modem 34 (FIG. 2) supplied to microprocessor 22 (FIG. 2) through interface circuit 23 (FIG. 2). As long as left bus 20 is idle, the condition of the CARRIER 2 output signal of modem 34 supplied to microprocessor 22 through interface circuit 23 is repeatedly monitored until left bus 20 is not found to be idle. If left bus 20 is not idle, indicating there is a packet on the bus, the program proceeds to instruction block 116 and copies the received packet into the received packet storage section of RAM 36 (FIG. 2). The program proceeds to decision block 118 and examines the source address of the copied packet to determine if it is the source address corresponding to its own BIU 16 (FIG. 1). If it is not, the program recognizes that it has received an aborted packet of a downstream BIU and instruction block 120 sets the PREEMPTIVE flag. Instruction block 122 adds the received packet to the aborted packet queue and the program returns to decision block 114 to loop and to await the receipt of another packet.

When a high priority packet aborts a plurality of downstream packets, each of the aborted packets will be strung together in the form of a serial train of aborted packets followed by the aborting packet. The instruction loop defined by steps 114–122 causes each of the aborted packets to be added to the aborted packet queue until BIU 16 receives its own packet which it had begun transmitting, see instruction block 110. When BIU 16 receives it own packet, the program proceeds to instruction block 119 from step 118. The program waits an interval of T seconds and then examines the PACKET ARRIVING flag (which is set by the regenerator subroutine logic of FIG. 8 if a transient packet is received by BIU 16 (FIG. 2)). The time interval T is the maximum bus propagation time and is defined as the maximum time it takes a packet to traverse the entire right bus 18 (or left bus 20) (FIG. 1).

Proceeding to decision block 121, the program determines if the PACKET ARRIVING flag is set. If it is not, the program continues to permit transmission of the packet from the transmit queue by executing decision block 123, until transmission is completed. When the transmission is finished, the program returns to instruction block 100 (FIG. 3).

Assuming that the PACKET ARRIVING flag was set when executing decision block 121, the program senses that BIU 16 (FIG. 2) was received a transient packet and must determine whether it should continue transmitting the packet it has been transmitting or whether it should abort that packet in favor of transmitting the transient packet. This decision is made by the subroutine illustrated in FIG. 5, which begins at instruction block 124 and generates appropriate control signals to move switches S3 and S4 (FIG. 2) into position B, so that the transient packet received by BIU 16 may be placed into RAM 36 (FIG. 2). As shown in FIG. 2, switch S3 is connected to the 02 output of shift register 30. The output signal available at output 02 of shift register 30 is sufficiently delayed with respect to the input signal thereto such that any transient packet received by BIU 16 while BIU 16 is transmitting will be retained in shift register 30 at the instant switches S3 and S4 moved into position B. This ensures that no portion of a transient packet is lost or destroyed before it can be placed into RAM 36.

Proceeding to decision block 125, the program determines if the transient packet is an equal or higher priority packet than the packet being transmitted by examining the PRIORITY flag of the transient packet, which examination is controlled by the regenerator subroutine logic (FIG. 8) as hereinbefore described. If the transient packet is not an equal or higher priority packet, the program permits BIU 16 (FIG. 2) to continue transmitting the packet it has been transmitting and stores the transient packet in the main memory section of RAM 36 (FIG. 2). To this end, the program proceeds to instruction block 126 which causes the transient packet to be moved from shift register 30 (FIG. 2) into the main memory section of RAM 36 (FIG. 2) and updates the main transmit queue such that the transient packet takes its appropriate place within the transient queue as hereinbefore described. Proceeding to instruction block 128, the program returns switches S2 and S4 to position A and waits for the transmission of the packet originally being transmitted to be completed by executing decision block 130. Once the transmission has been completed, the program returns to instruction block 100 (FIG. 3) and BIU 16 (FIG. 2) is returned to the passive mode.

Assuming the transient packet is a higher or equal priority packet when decision block 125 is executed, the program proceeds to instruction block 132 and moves the transient packet from shift register 30 (FIG. 2) into a buffer section (not shown) of RAM 36 (FIG. 2). The program then determines if the transmission of the packet being transmitted has been completed by executing decision block 134. If not, the program aborts the present transmission and sets the PREEMPTIVE and ABORTED PACKET flags by executing instruction block 136, indicating that the system is now in the preemptive mode and that BIU 16 has aborted one of its own transmissions, respectively. Proceeding to instruction block 138, the program adds the packet it has just aborted to the aborted packet queue and proceeds to instruction block 140.

Referring to decision block 134, if the present transmission has been completed, the program jumps directly to instruction block 140 and waits the interframe spacing period τ from the last transmission of an information packet on left bus 20 (more particularly, τ seconds from the end of the last information packet received by receive modem 34) and then signals memory controller 38 (FIG. 2) to begin transmission of the transient packet which had been moved into the buffer section of RAM 36. The program then signals switches S3 and S4 to return to position A and checks (step 130) for the transmission of the transient packet to be completed. Once transmission of the transient packet has been completed, the program returns to decision block 100 (FIG. 3) and BIU 16 is returned to the passive mode.

Referring to FIG. 4 and to decision block 112 therein, if the packet being transmitted is not a first priority packet, the program proceeds to decision block 144 and waits until it receives a packet on left bus 20. Once a packet has been received on left bus 20, instruction block 146 copies the received packet and places it in the received packet storage section (not shown) of RAM 36 (FIG. 2).

Proceeding to instruction block 148, the program waits bus propagation time T following completion of step 146, and then checks the PACKET ARRIVING flag to determine if a transient packet is being received by BIU 16 (FIG. 2). If the PACKET ARRIVING flag is set when decision block 150 is executed, the program proceeds to the subroutine illustrated in FIG. 5 and either continues transmission of the packet it has been transmitting (if the transient packet is a lesser priority packet) or aborts that transmission and begins transmitting the transient packet in the manner described above (if the transient packet is an equal or higher priority packet).

Assuming the PACKET ARRIVING flag is not set, the program proceeds to decision block 152 (FIG. 4) and determines if the source address of the copied packet is the source address of its own associated BIU 16 (FIG. 2). If it is, the program recognizes that no packets have been aborted and by executing step 123 waits for the completion of its transmission. When memory controller 38 (FIG. 2) has completed transmitting the packet, the program returns to instruction block 100 (FIG. 3) causing BIU 16 (FIG. 2) to be returned to the passive mode.

Assuming that the source address of the copied packet is not the address of BIU 16 under discussion, the program proceeds to decision block 156 (FIG. 4) and determines if the copied packet is an aborted packet. If it is, the program sets the PREEMPTIVE flag and adds the received packet to the aborted packet queue by executing instruction block 158. The program then returns to decision block 144. If the copied packet is not an aborted packet, the program proceeds to decision block 160 from step 156 and determines if the copied packet is addressed to its associated BIU 16 (FIG. 2). If it is, the program executes step 162 to place the packet in the user buffer section (not shown) of RAM 36 (FIG. 2) and returns to decision block 144. The packet stored in the user buffer is ultimately transferred to appropriate user 14 (FIG. 1) in a manner known in the art.

If the copied packet is not addressed to BIU 16 associated with the program it is discarded by executing instruction block 164 and the program returns to decision block 144. The program continues in the loop encompassing blocks 144-164 until it receives on left bus 20 the packet it has transmitted on right bus 18. At that time, it exits the loop from step 152 by proceeding to decision block 123.

Figure 6:
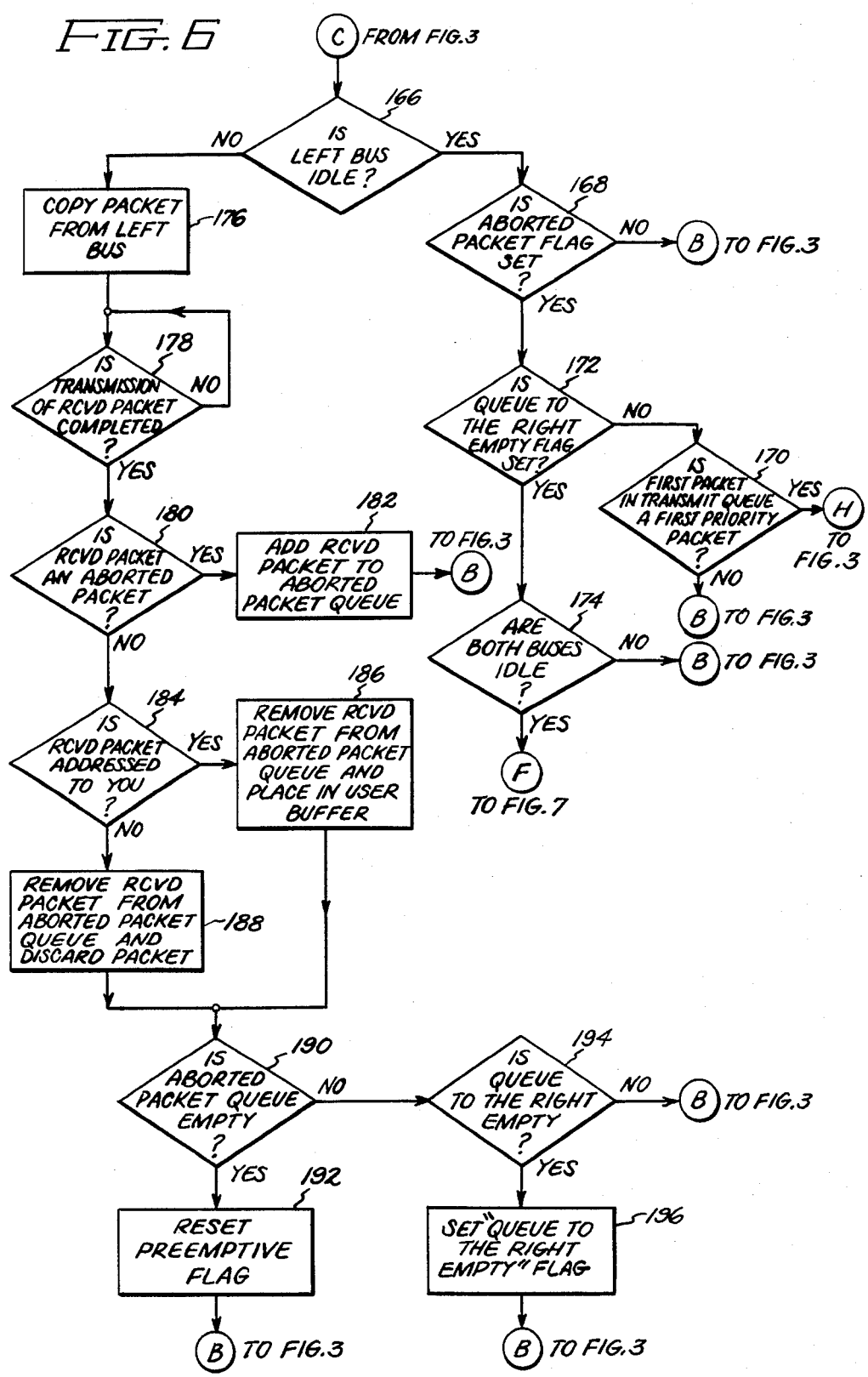

Referring to FIG. 6 and decision block 102 (FIG. 3), if the PREEMPTIVE flag is set (indicating that at least one transmitted packet has been aborted and that BIU 16 is operating in the preemptive mode), the program proceeds to decision block 166 (FIG. 6). When BIU 16 is operating in the preemptive mode, it places its own packets which have been previously aborted on right bus 18 when it is permitted to retransmit. BIU 16 is entitled to retransmit its aborted packet after each BIU having an aborted packet of a greater priority, or having an aborted packet of the same priority but being located upstream from BIU 16, has completed transmitting its aborted packet.

When BIU 16 initially enters the preemptive mode, it may be receiving a plurality of aborted packets on left bus 20. Accordingly, when the program determines if the left bus is idle by executing decision block 166, the answer will initially be no. The program proceeds to instruction block 176 and copies the packet from left bus 20 into the received packet storage section (not shown) of RAM 36 (FIG. 2). The program then determines if the transmission of the packet being received has been completed by executing decision block 178. When it has, the program determines if the received packet is an aborted packet by executing decision block 180. If the packet being received is an aborted packet, it is added to the aborted packet queue by executing instruction block 182 and the program returns to decision block 102 (FIG. 3).

If the received packet is not an aborted packet, the program proceeds from step 180 to decision block 184 to determine if the received packet is addressed to its associated BIU 16 (FIG. 2). If it is, the packet is removed from the aborted packet queue and placed in the user buffer section of RAM 36 (FIG. 2) by executing instruction block 186, for ultimate transmission to appropriate user 14 (FIG. 1). If the received packet is not addressed to associated BIU 16, it is removed from the aborted packet queue and discarded by executing instruction block 188. The packet can be discarded such as by being erased from the received packet storage section of RAM 36 or merely written over when the next packet is received.

Proceeding to decision block 190, the program determines if the aborted packet queue is empty. If it is, BIU 16 (FIG. 2) has completed the preemptive mode of operation. This is indicated by resetting the PREEMPTIVE flag by executing instruction block 192 and returning to decision block 102 (FIG. 3). If the aborted packet queue is not empty, the program proceeds from step 190 to decision block 194 to determine if the queue to the right is empty. The queue to the right is empty when all aborted packets which are either of a higher priority than the aborted packet of BIU 16 or of equal priority but associated with a BIU located upstream from BIU 16 under discussion have been retransmitted. If the queue to the right is not empty, the program returns to execute decision block 102 (FIG. 3). If the queue to the right is empty, the program proceeds from step 194 to instruction block 196 to set the QUEUE TO THE RIGHT EMPTY flag. When set, this flag indicates that BIU 16 can retransmit its aborted packet.

Again referring to decision block 166, if the left bus is idle, the program proceeds to decision block 168 to determine if the ABORTED PACKET flag is set. This flag is set if BIU 16 was transmitting a packet which was aborted in accordance with the subroutine illustrated in FIG. 5. If the ABORTED PACKET flag is no set, the program returns to step 102 (FIG. 3). Assuming that the ABORTED PACKET flag is set, the program proceeds to decision block 172 to determine if the QUEUE TO THE RIGHT EMPTY flag is set. If this flag is not set, the program proceeds to decision block 170 to determine if the first packet in the transmit queue is a first priority packet. If it is not, the program returns to decision block 102 (FIG. 3). If it is, the program returns to decision block 106 (FIG. 3) which causes the first priority packet to be transmitted in accordance with the subroutine illustrated in FIG. 4 since both left 20 and right 18 buses (FIG. 1) are idle. If the QUEUE TO THE RIGHT EMPTY flag is set, the program waits for both right 18 and left 20 buses (FIG. 1) to be idle by executing decision block 174 and then proceeds to the preemptive mode transmission subroutine illustrated in FIG. 7.

Figure 7:
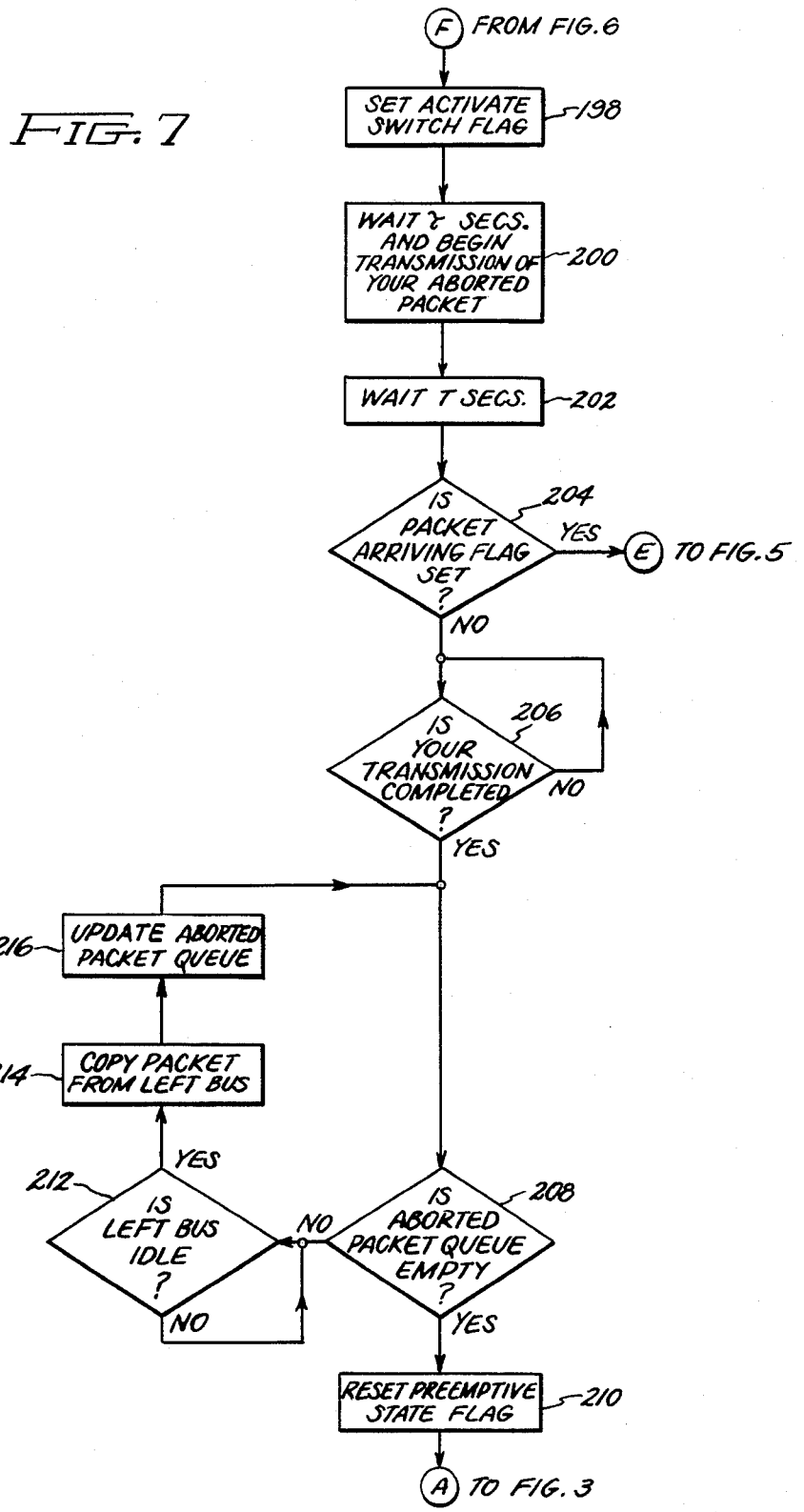

Referring to FIG. 7, the program proceeds to instruction block 198 from step 174 (FIG. 6) and sets the ACTIVATE SWITCH flag so as to cause switch S1 (FIG. 2) to be moved into position B, thereby permitting the tranmission of the aborted packet. The program then waits the interframe spacing time $\tau$ and begins transmission of the aborted packet in accordance with instruction block 200. Proceeding with the step 202 the program waits T seconds (the maximum bus propagation time) after the transmission begins, before executing step 204 to check the PACKET ARRIVING flag in order to determine if a new transient packet is being received by BIU 16 (FIG. 2). If the PACKET ARRIVING flag is set, the program proceeds to Step 124 of the conflict subroutine illustrated in FIG. 5 and either stores the transient packet for later transmission or begins transmission of the transient packet in the manner described below. If the PACKET ARRIVING flag is not set, the program proceeds to decision block 206 and checks for the transmission of the previously aborted packet to be completed. When the transmission is completed, the program determines if the aborted packet queue is empty by executing decision block 208. If the aborted packet queue is empty, indicating that BIU 16 need no longer be in the preemptive mode, the PREEMPTIVE flag is reset by executing instruction block 100 (FIG. 3) which returns BIU 16 to the passive mode.

If the aborted packet queue is not empty, the program proceeds to decision block 212 and waits for the receipt of an information packet on left bus 20 (FIG. 1) by executing decision block 212. Any packet received is copied into the received packet storage section of RAM 36 (FIG. 2) and the aborted packet queue is updated by executing instruction blocks 214 and 216, respectively. Steps 208, 212, 214 and 216 are repeated until the aborted packet queue is empty at which time the PREEMPTIVE flag is reset by executing step 210. The program returns from step 210 to execute instruction block 100 (FIG. 3) which returns BIU 16 to the passive mode.

In another embodiment of the present invention, all information packets arriving at a downstream BIU 16 (FIG. 1) on right bus 18 are examined to determine if they are addressed to a downstream user 14 and associated BIU 16 whenever a session is established between an upstream and downstream user. In this manner, information packets may be removed from right bus 18 (FIG. 1) by downstream BIU 16 thus decreasing the information packet flow on further downstream right bus 18 and on left bus 20. Information packets are removed from right bus 18, if a session has been established and if addressed to any user 14 associated with BIU 16 regardless of the source of the packet. A session is the establishment of a connection between two logical units, e.g. machine, human being. For example, two people talking on a telephone have established a session therebetween. Downstream BIU 16 continues to communicate with upstream BIU 16 and associated user 14 by placing its information packet on right bus 18 and having upstream BIU 16 receive the information packet on left bus 20. System configuration and operation is as hereinbefore described except as modified as shown in FIGS. 9 and 10 and described in conjunction therewith.

Generally, an upstream user requests a session with a downstream user only when it has a substantial number of information packets to send to the downstream user. Although a small delay results from examining the destination address of each information packet sensed during the passive mode, increased system efficiency is expected by easing downstream information packet flow, since once a session has been established between upstream and downstream users, it is anticipated that a greater than normal number of received information packets will be destined for downstream user 14.

A session between an upstream and downstream BIU and their associated users may be established as follows. A requesting user and its associated BIU desiring to establish a session with an addressee user and its associated BIU places an encoded request in an information packet addressed to the addressee user and its associated BIU. If the addressee user is free to establish a session, i.e. addressee user does not already have a session established with another user, then addressee user will encode an acknowledge or acceptance of the session into an information packet addressed to the requesting user and its associated BIU. Addressee BIU sets a SESSION ESTABLISHED flag in RAM 36 (FIG. 2) indicating that a session has been established with an upstream user. Once a session has been established, all information packets received on right bus 18 of the downstream BIU are examined to determine if they are addressed to a user associated with the downstream BIU. When the requesting user wants to end a session, it encodes an end of session message in an information packet. Upon receipt and decoding of this information packet containing the end of session message, the addressee BIU resets its SESSION ESTABLISHED flag, thus terminating the session.

Figure 9:
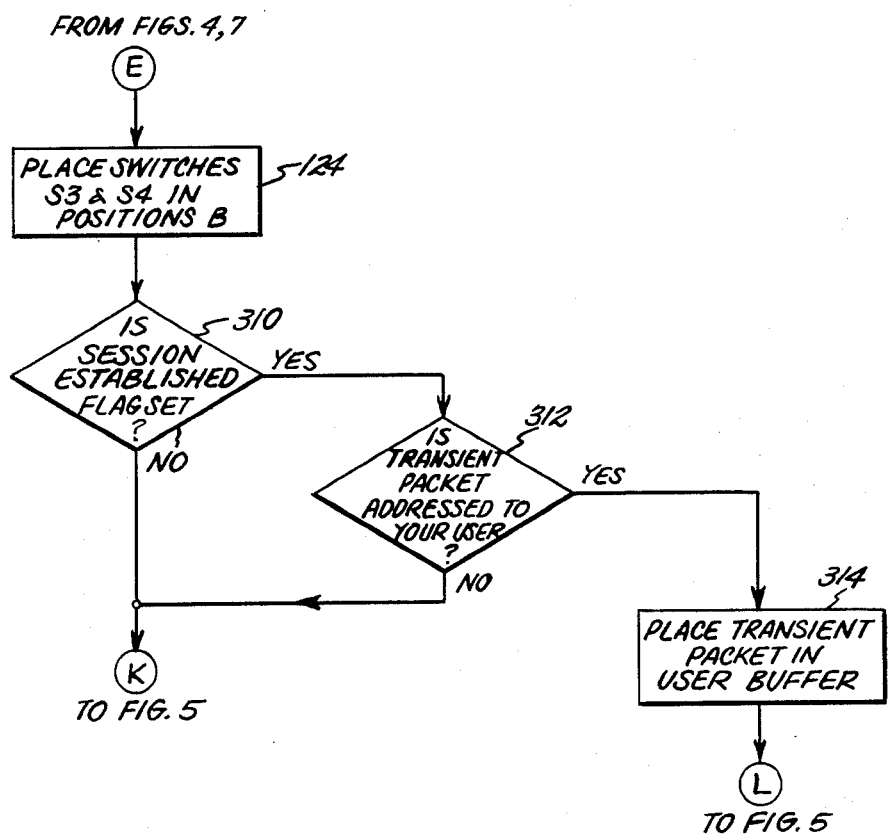

Referring to FIG. 9, a logic flow diagram for examining transient packets when a session with an upstream BIU 16 and user 14 associated therewith has been established in the active mode is shown. The logic flow of FIG. 9 may be included as a modification of the logic flow of FIG. 5 as hereinbefore described wherein like numerals represent like steps.

From step 124 the program proceeds to step 310 to determine if a SESSION ESTABLISHED flag has been set, signifying a session has been established with an upstream user. If the SESSION ESTABLISHED flag is not set, the program proceeds to step 125 (FIG. 5) and continues in accordance with the description accompanying FIG. 5.

If the SESSION ESTABLISHED flag has been set, the program executes step 312 to determine if the transient packet is addressed to user 14 (FIG. 1) associated with downstream BIU 16 (FIG. 1). If not addressed to user 14, the program proceeds to step 125 and continues in accordance with the description accompanying FIG. 5. If the transient packet is addressed to user 14, step 314 causes the transient packet to be placed in the user buffer section of RAM 36 (FIG. 2) to await subsequent transfer to user 14 thus removing the transient packet from right bus 18 (FIG. 1). After step 314 the program proceeds to step 128 (FIG. 5) and continues in accordance with the description accompanying FIG. 5.

Referring to FIG. 10, a logic flow diagram for examining transient packets when a session with an upstream BIU 16 and user 14 associated therewith has been established in the passive mode is shown. The logic flow of FIG. 10 may be included as a modification of the logic flow of FIG. 3 as hereinbefore described, wherein like numerals represent like steps.

From step 104 the "no" path to step 106 (FIG. 3) is as hereinbefore described. If the transient queue is empty, the program proceeds from step 104 to step 350 to determine if a SESSION ESTABLISHED flag has been set, signifying a session has been established with an upstream user. If the SESSION ESTABLISHED flag is not set, the program proceeds to step 102 (FIG. 3). If the SESSION ESTABLISHED flag has been set, the program executes step 352 to determine if the right bus 18 (FIG. 2) is idle. If it is idle, the program proceeds to step 102 (FIG. 3) and if it is not idle, step 354 is executed, placing switches S3 and S4 in positions B. Step 356 is then executed to determine if the transient packet is addressed to user 14 (FIG. 1) associated with downstream BIU 16 (FIG. 1). If so, step 358 causes the transient packet to be placed in the user buffer section of RAM 36 (FIG. 2) to await subsequent transfer to user 14, thus removing the transient packet from right bus 18 (FIG. 1). After step 358, the program proceeds to step 102 (FIG. 3).

If the transient packet is not addressed to user 14 (FIG. 1), then step 360 is executed after step 356 to move the transient packet into a buffer section (not shown) of RAM 36 (FIG. 2). Transmission of the transient packet next begins at step 362 and the program loops at step 364 until the transmission of the transient packet is completed. When the transmission is completed, the program proceeds to step 102 (FIG. 3).

Thus has been illustrated and described a bus accessing system and method wherein fast access to the bus is provided under light bus utilization and further wherein collisions on the bus are at all times avoided to permit heavy bus utilization.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. A bus communication system, comprising:
   (a) a plurality of segments of a unidirectional transmit bus;
   (b) a unidirectional receive bus such that information packets from said transmit bus are placed on said receive bus; and
   (c) a plurality of bus interface units (BIUs) coupled in series with successive segments, respectively, of said transmit bus, each said BIU including a transmit bus input and a transmit bus output, said transmit bus input of each BIU being coupled, respectively, to the transmit bus output of the next upstream BIU, each said BIU also including a receive bus input connected to said receive bus, each said BIU being capable of transmitting an information packet of predetermined priority on said transmit bus, each said BIU including:

(1) a memory for storing a plurality of information packets to be transmitted; and (2) a control circuit associated with said memory for selectively operating said BIU in an active and a passive mode, said control circuit causing said BIU to operate as a repeater during said passive mode such that packets received on said transmit bus input are retransmitted on said transmit bus output and causing said BIU to operate as a transmitter during said active mode such that said BIU sequentially transmits said information packets stored in its said memory in accordance with said predetermined priority.

2. The system of claim 1 wherein each said BIU further includes means coupled to said transmit bus input for reconstituting information bits of packets received by said BIU.

3. The system of claim 2 wherein said means for reconstituting comprises a one-shot multivibrator.

4. The system of claim 3 wherein said means for reconstituting further comprises a shift register having the input thereof coupled to the output of said one-shot multivibrator.

5. The system of claim 1 wherein said transmit bus and said receive bus each comprise a fiber optic strand.

6. The system of claim 5 further comprising a first photon-to-electron converter coupled to said transmit bus input, an electron-to-photon converter coupled to said transmit bus output and a second photon-to-electron converter coupled to said receive bus input.

7. The system of claim 1 further comprising switch means coupled to said control circuit for directing to said transmit bus output during said passive mode information packets received on said transmit bus input and for directing to said memory during said active mode information packets received on said transmit bus input.

8. The system of claim 1 further comprising means coupled to said control circuit for directing to said memory information packets received on said transmit bus input when a session has been established with an upstream BIU.

9. The system of claim 1 wherein said control circuit comprises a memory controller coupled to said memory and a microprocessor coupled to said memory controller.

10. The system of claim 9 further comprising a second memory coupled to said microprocessor.

11. A bus interface unit (BIU) for data communication systems, comprising:

(a) a transmit bus output for placing data on said data bus;

(b) a transmit bus input for receiving data from said data bus;

(c) memory means for storing said data in accordance with a predetermined priority;

(d) a receive bus input for receiving data from a receive data bus;

(e) control means coupled to said memory means for transmitting said data stored in said memory means in accordance with said predetermined priority; and (f) switching means for controllably coupling said transmit bus output, said transmit bus input, and said receive bus input to said memory means, said switching means being operable in response to said control means.

12. The BIU of claim 11 further comprising shaping means coupling said transmit bus input to said switching means, said shaping means reconstituting bits of data received from said data bus.

13. The BIU of claim 12 wherein said shaping means comprises a multivibrator.

14. The BIU of claim 13 wherein said shaping means further includes a shift register coupled to the output of said multivibrator.

15. The BIU of claim 11 further comprising a photon-to-electron converter coupling said transmit bus input to said switching means and an electron-to-photon converter coupling said transmit bus output to said switching means.

16. The BIU of claim 11 further comprising a photon-to-electron converter coupling said receive bus input to said switching means.

17. The BIU of claim 11 further comprising a first and second photon-to-electron converter coupling said transmit bus input and said receive bus input, respectively, to said switching means and an electron-to-photon converter coupling said transmit bus output to said switching means.

18. The BIU of claim 12 further comprising a photon-to-electron converter coupling said transmit bus input to said shaping means and an electron-to-photon converter coupling said transmit bus output to said switching means.

19. The BIU of claim 12 further comprising a photon-to-electron converter coupling said receive bus input to said switching means.

20. The BIU of claim 12 further comprising a first and second photon-to-electron converter coupling said transmit bus input to said shaping means and said receive bus input to said switching means, respectively, and an electron-to-photon converter coupling said transmit bus output to said switching means.

21. A method for transmitting information packets among a plurality of bus interface units (BIUs) spaced along and coupled to a unidirectional transmit bus and a unidirectional receive bus wherein each BIU comprises a transmit bus input and a transmit bus output, said transmit bus input of each BIU being coupled to said transmit bus output of the next upstream BIU, respectively, each of said BIUs also comprising a receive bus input connected to said receive bus, each of said BIUs including a memory for storing a plurality of information packets to be transmitted, said transmit bus being coupled to said receive bus such that information packets from said transmit bus are placed on said receive bus, said method comprising the steps of:

(a) operating a selected one of said BIUs in a passive mode when said selected BIU has no information packet stored in its said memory to be transmitted, said selected BIU acting as a repeater during said passive mode wherein information packets received on its said transmit bus input are retransmitted on its said transmit bus output; and (b) operating said selected BIU in an active mode when said selected BIU has one or more information packets stored in said memory to be transmitted, said selected BIU transmitting said information packets stored in its associated said memory during said active mode in a predetermined sequence in accordance with the priority of said stored information packets.

22. The method of claim 21 further comprising assigning a predetermined priority to each of said information packets in order to establish said predetermined sequence for transmitting.

23. The method of claim 22 further comprising:
(a) aborting transmission of an information packet when said BIU receives a higher or equal priority information packet on its transmit bus input than it is transmitting; and
(b) storing the aborted information packet in said memory for transmission at a later time.

24. The method of claim 22 further comprising:
(a) maintaining uninterrupted transmission of an information packet from said memory when said BIU receives a lower priority information packet on its said transmit bus input than it is transmitting; and
(b) storing the lower priority information packet in said memory for transmission at a later time.

25. The method of claim 22 further comprising transmitting each of said information packets stored in said memory in order of their priority.

26. The method of claim 25, further including listing said stored information packets in order of the position along said transmit bus of each BIU which originated each said stored information packet, respectively, such that each information packet stored in said memory of said BIU is transmitted in order of priority and, within said priority, in order of location along said bus of the BIU which initiated said each information packet.

27. The method of claim 21 further comprising copying all information packets received at each BIU on the received bus input thereto, respectively, into a received packet storage section of said memory, thereof, respectively.

28. The method of claim 23 further comprising:
(a) placing an abort flag at the end of an information packet whose transmission is aborted;
(b) examining the contents of a received packet storage section of said memory; and
(c) operating said BIU in a preemptive mode whenever the BIU senses that an information packet in said received packet storage section of its associated said memory contains an abort flag.

29. The method of claim 28 further comprising listing all aborted information packets received on said receive bus input at each BIU, respectively, in an aborted queue in order of priority and within said priority, in order of location of the BIU originating said aborted information packet.

30. The method of claim 29 further comprising retransmitting said aborted information packet after all aborted information packets of higher priority and all aborted information packets of equal priority and originating from BIUs located upstream of said BIU originating said aborted information packet have been retransmitted.

31. The method of claim 21 wherein the step of operating a selected one of said BIUs in a passive mode includes, at said selected one of said BIUs
(a) examining the destination address of each information packet received at said transmit bus input if a session has been established with an upstream BIU; and
(b) removing from said transmit bus each information packet received thereon which is addressed to said selected one of said BIUs.

32. The method of claim 22 further comprising:
(a) aborting transmission of an information packet when said BIU receives a higher priority information packet on its transmit bus input than it is transmitting; and
(b) storing the aborted information packet in said memory for transmission at a later time.

33. The method of claim 22 further comprising:
(a) maintaining uninterrupted transmission of an information packet from said memory when said BIU receives a lower or equal priority information packet on its said transmit bus input than it is transmitting; and
(b) storing the lower or equal priority information packet in said memory for transmission at a later time.

34. A method for transmitting information packets among a plurality of bus interface units (BIUs), each of said BIUs having a unique designation of a source and destination, said BIUs being spaced along and coupled to a unidirectional transmit bus and a unidirectional receive bus and capable of placing information packets from said transmit bus onto said receive bus, each packet having source and destination indicators encoded therein, comprising:
(a) sensing at each BIU the transmit and receive buses to determine if information packets are on the transmit and receive buses;
(b) initiating placement of a first information packet from a BIU on the transmit bus at an instant when no information packets are sensed on both the transmit and receive bus; and
(c) removing a second information packet subsequently sensed on the transmit bus from the transmit bus while placing said first information packet on the transmit bus and storing the removed second information packet.

35. The method of claim 34 further comprising placing the stored packet on the transmit bus at an instant when no information packets are sensed on both the transmit and receive buses.

36. The method of claim 34 further comprising encoding a predetermined priority into said first information packet.

37. The method of claim 36 further comprising:
(a) comparing the predetermined priority of said first information packet with the priority of said second information packet having a predetermined priority encoded therein;
(b) aborting placement of said information packet on the transmit bus when the priority of said second information packet is equal to or greater than the priority of said information packet; and
(c) placing said second information packet on the transmit bus at an instant when no information packets are sensed on both the transmit and receive buses.

38. The method of claim 34 further comprising:
(a) copying a third information packet sensed on the receive bus from the receive bus at each of the plurality of BIUs; and
(b) determining at each BIU if the copied third information packet has a source and destination of the copying BIU.

* * * * *